United States Patent
Howell (12)

(10) Patent No.: US 6,374,407 B1
(45) Date of Patent: Apr. 23, 2002

(54) COUNTERWEIGHT-NIGHT VISION GOGGLE SYSTEM

(76) Inventor: Frank A. Howell, 15 Cotton La., Oxford, ME (US) 04270

( * ) Notice: Subject to any disclaimer, the term of this patent is extended or adjusted under 35 U.S.C. 154(b) by 17 days.

(21) Appl. No.: 09/584,212

(22) Filed: May 31, 2000

(51) Int. Cl.[7] .............................. A41D 3/04; A61F 9/02
(52) U.S. Cl. .................................... 2/6.7; 2/422; 2/426
(58) Field of Search ............................ 2/422, 424, 426, 2/6.3, 6.7; 345/8; 362/105, 106; 359/409, 815

(56) References Cited

U.S. PATENT DOCUMENTS

| | | | | |
|---|---|---|---|---|
| 4,276,657 A | * | 7/1981 | Montesi | 2/422 |
| 5,608,919 A | * | 3/1997 | Case | 2/422 |
| 5,796,374 A | * | 8/1998 | Cone et al. | 345/8 |
| 5,996,127 A | * | 12/1999 | Leslie | 2/422 |

* cited by examiner

*Primary Examiner*—Peter Nerbun
(74) *Attorney, Agent, or Firm*—Samuels, Gauthier & Stevens

(57) ABSTRACT

A counterweight attached to the back of a ballistic helmet to balance the load of a night vision goggle which night vision goggle is secured to the front edge of a ballistic helmet. The counterweight includes a back plate having fingers extending inward to engage the helmet. The fingers space the back plate apart from the surface of the helmet to define a slot with the helmet. A pair of arms are joined to the back plate and extend laterally outward from the back plate and define a recess on the inner surface of the back plate. Hooks are secured to and extend inwardly from guide surfaces on the arms. These hooks engage the rear edge of the helmet. The back plate has a recess defined in its outer surface which recess is partially in registration with the recess on the inner surface of the back plate.

4 Claims, 2 Drawing Sheets

COUNTERWEIGHT-NIGHT VISION GOGGLE SYSTEM

BACKGROUND OF THE INVENTION

1. Field of the Invention

The invention relates to a counterweight used to balance a night vision goggle (NVG) on various military ballistic protection helmets.

2. Description of the Relevant Art

Military personnel for training and combat missions, wear protective helmets. These helmets typically include various accessories, such as attached ear cups and thin armed microphones. During night operations, a soldier or marine may wear a NVG attached to the front of his or her ballistic helmet to permit vision in the dark. A NVG typically uses a mounting plate that hooks under the brow of the helmet. This plate is held in place by a strap that stretches over the crown of the helmet and has a bracket that hooks under the rear edge of the helmet near the nape of the wearer's neck. The strap is tightened by a locking tensioning lever that secures the mounting plate.

The weight of the NVG (often two pounds or more) tends to force the brow of the ballistic helmet forwardly and downwardly. Over time the strain of countering this weight can cause significant neck strain and headaches for the wearer.

An object of the invention is to eliminate the strain caused by the NVG.

BRIEF SUMMARY OF THE INVENTION

Broadly, a counterweight is attached to the back of the ballistic helmet to balance this load on the wearer's head. The counterweight is designed to ensure that it functions in combination with the other accessories that can be used with the ballistic helmet.

A counterweight embodying the invention comprises a back plate having fingers extending from the upper end of the back plate. The fingers extend inwardly to engage the helmet. The fingers space the back plate apart from the surface of the helmet to define a slot with the helmet. A pair of arms are joined to the back plate and extend laterally outward from the back plate and define a recess on the inner surface of the back plate. The arms include guide surfaces. Hooks are secured to and extend inwardly from the guide surfaces. The hooks engage the rear edge of the helmet. The back plate has a recess defined in its outer surface which recess is partially in registration with the recess on the inner surface of the back plate. The NVG's bracket that normally hooks under the rear edge of the helmet, hooks in the recesses of the back plate. The counterweight is also shaped to provide a clearance for the ear cup tensioning systems used in ballistic helmets, see U.S. Pat. No. 5,752,298.

DESCRIPTION OF THE PREFERRED EMBODIMENT(S)

Figure 1:
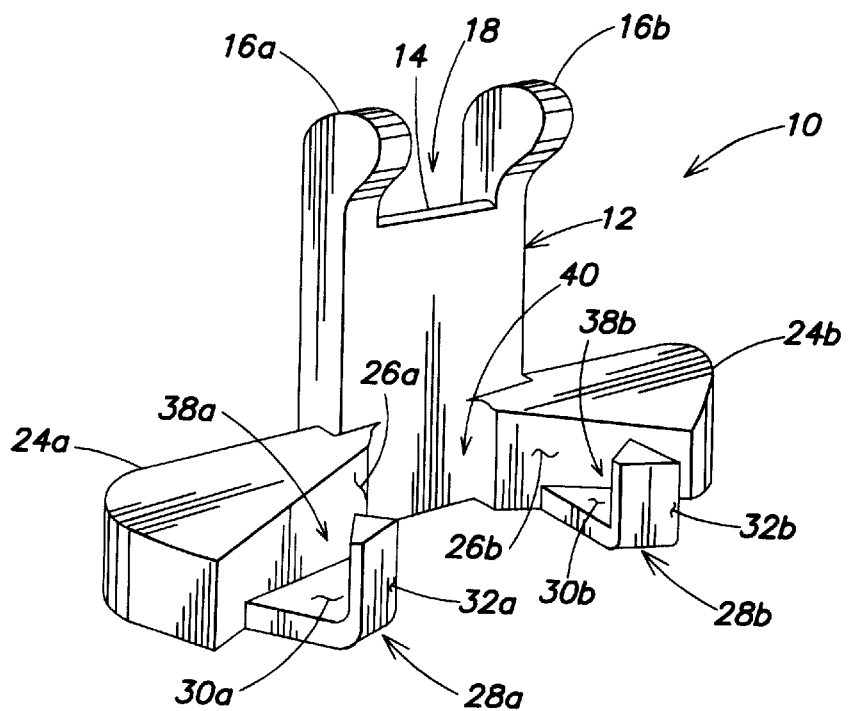
FIG. 1 is a perspective front view of a counterweight embodying the invention.

Referring to FIG. 1, a counterweight is shown generally at 10 and comprises a back 12 having an upper end 14 and fingers 16a and 16b extending from the upper end 14 and defining a recess 18 therebetween.

Figure 2:
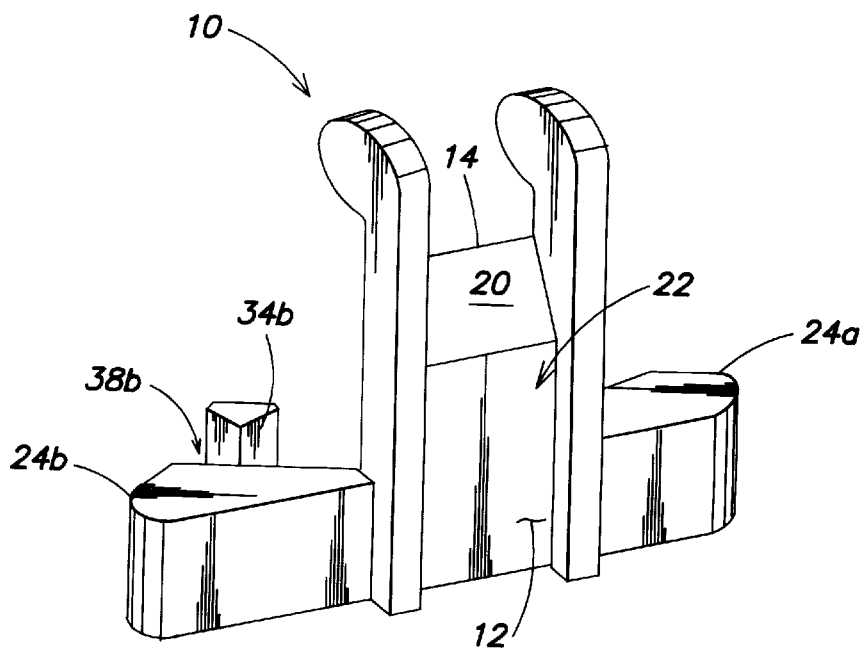
FIG. 2 is a back perspective view of FIG. 1.

Referring to FIG. 2, the upper end 14 is characterized by a sloped surface 20. Further, a recess 22 is formed in the outer surface of the back 12.

Referring to FIG. 1, extending from the back 12 are arms 24a and 24b. The arms 24 define a recess 40 on the inner surface of the back plate 12. The arms are characterized by guide surfaces 26a and 26b and hooks 28a and 28b extending outwardly from the surfaces 26. The hooks 28a and 28b each comprise a floor 30a and 30b and a wall 32a and 32b.

Referring to FIG. 2, each wall 32 comprises guide surfaces 34a and 34b (34b not shown) which guide surfaces 34 are spaced apart from guide surfaces 26 to define recesses 38a and 38b therebetween.

Figure 3:
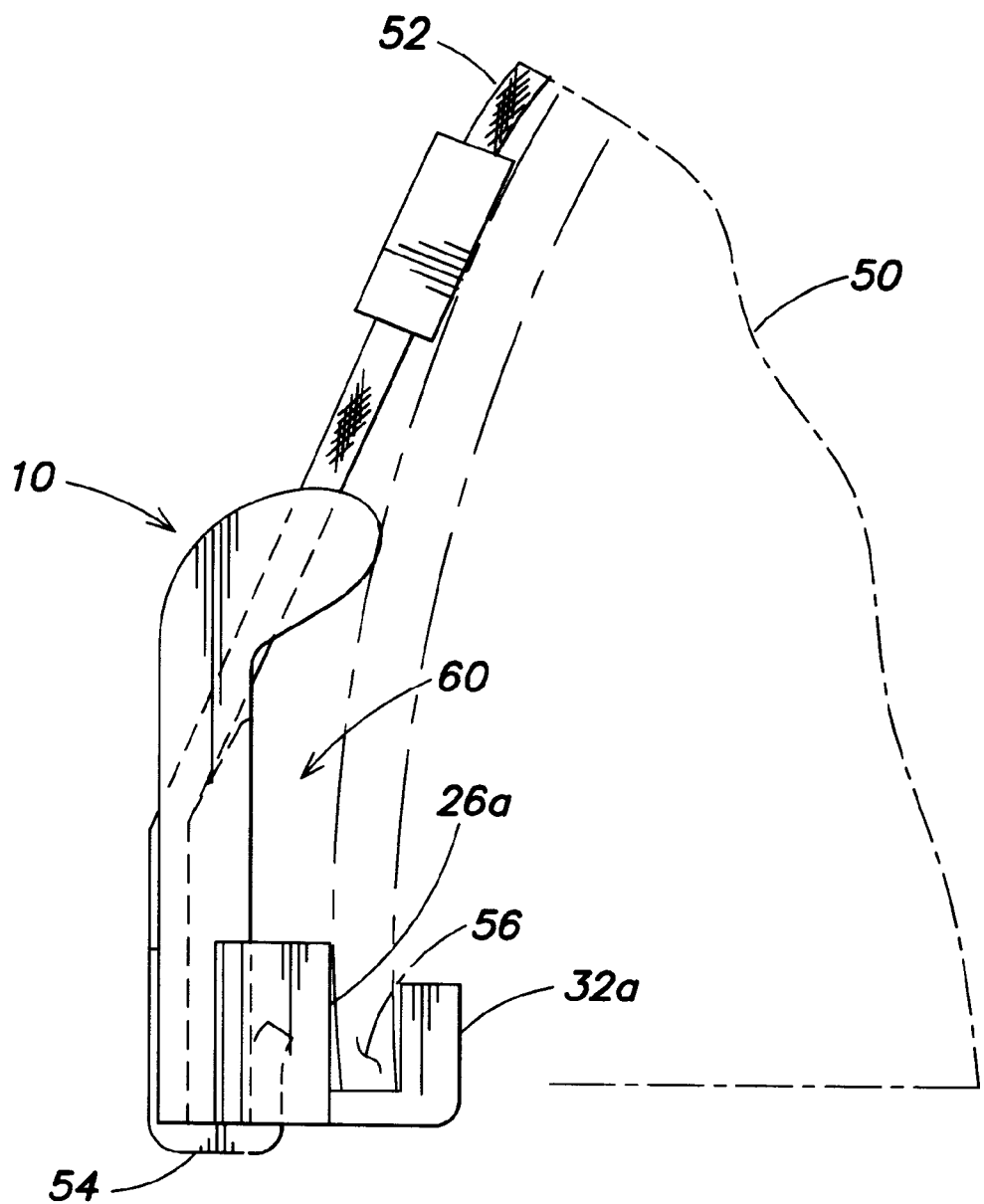
FIG. 3 is a left side view of the helmet of FIG. 1 with a fragmentary prior art ballistic helmet shown in dotted lines.

Referring to FIG. 3, a ballistic helmet is shown generally at 50. A strap 52 is secured at one end to a bracket 54 and secured at the other end to a NVG (not shown). After the NVG has been secured to the helmet 50 then the prior art bracket is secured to the counterweight 10 which counterweight engages the lower rear edge of the helmet. The strap 52 is tightened.

The helmet 50 has a rear edge 56 to which the counterweight 10 is secured. The rear edge 56 is received between the guide surface 26a and wall 32a and seats on the floor 30a. A slot 60 is formed between the opposed surfaces of the back 12 and the helmet 50.

The recess 22 in the outer surface of the back wall 12, together with the recess 40 on the inner surface of the back wall 12, allow the prior art bracket 54 to engage and secure the counterweight 10. The strap 52 extends across the rear of the back, the fingers locating the strap in the recess 18. When the strap is tightened then the NVG is counter-balanced providing for increased comfort for the wearer of the helmet.

The recess 60 provided by the fingers 16 which keeps the back 12 spaced apart from the helmet 50 allows an ear cup tensioning system to function for its intended purpose.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A counterweight for a night vision goggle, which night vision goggle is secured to the front edge of a ballistic helmet, the helmet also having a rear edge, which comprises:

a back plate having fingers extending from the upper end of the back plate, the fingers adapted to engage the outer surface of the helmet when the counterweight is engaged to the helmet, the back plate defining a slot with the outer surface of the helmet;

a pair of arms joined to the lower portion of the back plate and extending laterally outward from the back plate, the arms including guide surfaces;

hooks secured to and extending inwardly from the guide surfaces, the hooks adapted to engage the rear edge of the helmet; and means formed in the counterweight to locate and secure the bracket to the counterweight.

2. The device of claim 1 wherein the means to locate and secure comprises:

a recess in the outer surface of the back plate.

3. The device of claim 1 wherein the means to locate and secure comprises:

a recess formed on the inner surface of the back plate.

4. The counterweight of claim 3 wherein the fingers define a recess therebetween to locate the strap.

* * * * *